US008039554B2

(12) United States Patent
Iseki et al.

(10) Patent No.: US 8,039,554 B2
(45) Date of Patent: *Oct. 18, 2011

(54) ETHYLENE-α-OLEFIN COPOLYMER, RESIN COMPOSITION CONTAINING THE SAME AND MOLDED ARTICLE THEREOF

(75) Inventors: Yuki Iseki, Scarsdale, NY (US); Katsuhiro Yamada, Ichihara (JP); Yasutoyo Kawashima, Ichihara (JP); Yoshinobu Nozue, Ichihara (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 318 days.

This patent is subject to a terminal disclaimer.

(21) Appl. No.: 11/528,243

(22) Filed: Sep. 28, 2006

(65) Prior Publication Data

US 2007/0093627 A1    Apr. 26, 2007

(30) Foreign Application Priority Data

Sep. 30, 2005  (JP) ................................ 2005-286849
Mar. 31, 2006  (JP) ................................ 2006-097936

(51) Int. Cl.
C08L 23/00      (2006.01)
C08L 23/04      (2006.01)
C08C 19/22      (2006.01)
C08F 8/34       (2006.01)

(52) U.S. Cl. ........ 525/240; 525/191; 526/348; 526/352; 526/352.2

(58) Field of Classification Search .................. 525/240, 525/191; 526/348, 348.6, 352
See application file for complete search history.

(56) References Cited

U.S. PATENT DOCUMENTS

| | | | | |
|---|---|---|---|---|
| 5,459,217 A | * | 10/1995 | Todo et al. ................. | 526/348.1 |
| 5,530,065 A | * | 6/1996 | Farley et al. .................. | 525/240 |
| 7,335,715 B2 | * | 2/2008 | Iseki et al. ..................... | 526/348 |
| 7,339,019 B2 | * | 3/2008 | Iseki et al. ..................... | 526/348 |
| 2004/0030082 A1 | * | 2/2004 | Iseki .......................... | 526/348.2 |
| 2005/0192417 A1 | * | 9/2005 | Iseki et al. ...................... | 526/72 |

* cited by examiner

*Primary Examiner* — Vasu Jagannathan
*Assistant Examiner* — Irina Krylova
(74) *Attorney, Agent, or Firm* — Fitch, Even, Tabin & Flannery

(57) ABSTRACT

An ethylene-α-olefin copolymer having monomer units derived from ethylene and monomer units derived from an α-olefin of 3 to 20 carbon atoms, a melt flow rate (MFR) of 0.01 to 4 g/10 minutes, a density of 890 to 970 kg/m$^3$, an activation energy of flow of 50 kJ/mol or more and a molecular weight distribution measured by gel permeation chromatography of 3 or more, wherein a characteristic relaxation time (τ) determined by a melt viscoelasticity measurement or an external haze ratio (EHR) satisfies a relationship of the following formula (1) or (2), respectively:

$$3 \times MFR^{-0.75} + 1.1 > \tau > 1.3 \times MFR^{-0.5} + 1.4 \quad (1)$$

$$EHR \leq -15 \times \log MFR + 0.145 \times d - 47 \quad (2)$$

14 Claims, No Drawings

US 8,039,554 B2

ETHYLENE-α-OLEFIN COPOLYMER, RESIN COMPOSITION CONTAINING THE SAME AND MOLDED ARTICLE THEREOF

This application claims priority to foreign applications JP 2006-097936 filed on Mar. 31, 2006 and JP 2005-286849 filed on Sep. 30, 2005, the disclosures of which are incorporated herein by reference in their entirety.

BACKGROUND OF THE INVENTION

1. Field of the Invention

The present invention relates to an ethylene-α-olefin copolymer, a resin composition containing the copolymer and a molded article obtained from the resin composition.

2. Description of the Related Arts

As films, sheets and tubes used for packaging foods or non-food, molded articles obtained by extrusion molding of ethylene-α-olefin copolymers are much used.

In these ethylene-α-olefin copolymers, an excellent moldability such as low extrusion load and good stability in processability is required. As such the ethylene-α-olefin copolymers, for example, there is disclosed an ethylene-1-butene copolymer which is obtained by copolymerizing ethylene and 1-butene with a catalyst formed by: adding triisobutylaluminum to silica; then adding an organic aluminumoxy compound thereto; and next adding a catalyst component produced by reacting bis(indenyl)ethane, n-butyllithium and zirconium tetrachloride (e.g. JP 4-213309 A). Further, there is disclosed an ethylene-1-butene copolymer which is obtained by copolymerizing ethylene and 1-butene with a catalyst formed by contacting triisobutylaluminum with racemi-ethylenebis(1-indenyl)zirconium diphenoxide, then contacting a co-catalyst therewith (e.g. JP 2004-149760 A, JP 2005-97481 A).

However, when the above-mentioned ethylene-α-olefin copolymer was compounded to a conventional ethylene-α-olefin copolymer to use as a resin composition for improving the moldability, a molded article obtained was not sufficiently satisfied in optical properties.

DISCLOSURE OF THE INVENTION

An object of the present invention is to provide an ethylene-α-olefin copolymer having a good moldability and providing molded articles of a resin composition with the conventional ethylene-α-olefin copolymer excellent in optical properties, a composition containing the ethylene-α-olefin copolymer and the conventional ethylene-α-olefin copolymer and a molded article obtained from the resin composition.

The present invention (hereinafter, sometimes referred to as "first invention") is to provide an ethylene-α-olefin copolymer having monomer units derived from ethylene and monomer units derived from an α-olefin of 3 to 20 carbon atoms, a melt flow rate (MFR) of 0.01 to 4 g/10 minutes, a density (d) of 890 to 970 kg/m³, an activation energy of flow (Ea) of 50 kJ/mol or more and a molecular weight distribution (Mw/Mn) measured by gel permeation chromatography of 3 or more, wherein a characteristic relaxation time (τ, unit is second) determined by a melt viscoelasticity measurement and the MFR satisfy a relationship of the following formula (1):

$$3 \times MFR^{-0.75} + 1.1 > \tau > 1.3 \times MFR^{-0.5} + 1.4 \tag{1}$$

Another aspect of the present invention (hereinafter, sometimes referred to as "second invention") relates to an ethylene-α-olefin copolymer having monomer units derived from ethylene and monomer units derived from an α-olefin of 3 to 20 carbon atoms, a melt flow rate (MFR) of 0.01 to 100 g/10 minutes, a density (d) of 890 to 970 kg/m³, an activation energy of flow (Ea) of 50 kJ/mol or more and a molecular weight distribution (Mw/Mn) measured by gel permeation chromatography of 3 or more, wherein an external haze ratio (EHR), the MFR and the density satisfy a relationship of the following formula (2):

$$EHR \leq 15 \times \log MFR + 0.145 \times d - 47 \tag{2}$$

Still further, the present invention relates to a resin composition comprising an ethylene-α-olefin copolymer having 3 to 20 carbon atoms produced by copolymerizing ethylene and an α-olefin having 3 to 20 carbon atoms in the presence of a polymerization catalyst containing a solid component containing titanium, magnesium and a halogen, and the ethylene-α-olefin copolymer of the first invention or second invention.

Still further, the present invention relates to a molded article obtained from the resin composition.

DETAILED DESCRIPTION OF THE INVENTION

The ethylene-α-olefin copolymer of the present invention is an ethylene-α-olefin copolymer having monomer units derived from ethylene and monomer units derived from an α-olefin of 3 to 20 carbon atoms.

Examples of the α-olefin having 3 to 20 carbon atoms include propylene, 1-butene, 1-pentene, 1-hexene, 1-heptene, 1-octene, 1-nonene, 1-decene, 1-dodecene, 4-methyl-1-pentene and 4-methyl-1-hexene, and these may be used alone or in combination of 2 or more. 1-hexene and 4-methyl-1-pentene are preferred.

The content of the monomer unit derived from ethylene is from 50 to 99.5 wt % based on the total weight (100 wt %) of the ethylene-α-olefin copolymer. In addition, the content of the monomer unit derived from an α-olefin having 3 to 20-carbon atoms is from 0.5 to 50 wt % based on the total weight (100 wt %) of the ethylene-α-olefin copolymer.

The ethylene-α-olefin copolymer of the present invention may also contain monomer units derived from other monomers than ethylene and α-olefins having 3 to 20 carbon atoms within a range not damaging the effect of the present invention. Examples of other monomers include conjugated dienes (e.g. butadiene, isoprene), non-conjugated dienes (e.g. 1,4-pentadiene), acrylic acid, acrylates (e.g. methyl acrylate, ethyl acrylate), methacrylic acid, methacrylates (e.g. methyl methacrylate, ethyl methacrylate) and vinyl acetate.

The ethylene-α-olefin copolymer of the present invention is preferably a copolymer of ethylene and an α-olefin of 4 to 20 carbon atoms, more preferably a copolymer of ethylene and an α-olefin of 5 to 20 carbon atoms, most preferably a copolymer of ethylene and an α-olefin of 6 to 20 carbon atoms. Examples of the ethylene-α-olefin copolymer include an ethylene-1-hexene copolymer, ethylene-4-methyl-1-pentene copolymer, ethylene-1-octene copolymer, ethylene-1-butene-1-hexene copolymer, ethylene-1-butene-4-methyl-1-pentene copolymer and ethylene-1-butene-1-octene copolymer, preferably an ethylene-1-hexene copolymer, ethylene-4-methyl-1-pentene copolymer, ethylene-1-butene-1-hexene copolymer and ethylene-1-butene-4-methyl-1-pentene copolymer, more preferably an ethylene-1-hexene copolymer and ethylene-1-butene-1-hexene copolymer.

The ethylene-α-olefin copolymer has a density of 890 to 970 kg/m³, the density is preferably 900 kg/m³ or more from the viewpoint of improving rigidity of molded articles, more preferably 905 kg/m³ or more, further preferably 910 kg/m³ or more. On the other hand, the density is preferably 940 kg/m³ or less from the viewpoint of improving impact strength of molded articles, more preferably 930 kg/m³ or less. The density of the copolymer is measured according to A-method in JIS K7112-1980 after annealed according to JIS K6760-1995.

The ethylene-α-olefin copolymer of the present invention is a one which is excellent in moldability and has a long chain branching, and such the ethylene-α-olefin copolymer has a high activation energy of flow (Ea; unit is kJ/mol) compared to the conventional linear ethylene-α-olefin copolymer. The Ea of the conventional copolymer is lower than 50 kJ/mol, therefore, a sufficient satisfaction could not be sometimes obtained in the mold processability, particularly in the extrusion load.

The Ea of the ethylene-α-olefin copolymer of the present invention is, from the viewpoint of enhancing moldability, particularly from the viewpoint of reduction of extrusion load without excessive decrease of the melt tension, preferably 55 kJ/mol or more, more preferably 60 kJ/mol or more. Further, it is preferably 100 kJ/mol or less, more preferably 90 kJ/mol or less from the viewpoint of enhancement of optical properties of extrusion-molded articles.

The above-mentioned Ea is a numerical value calculated according to the Arrhenius equation from a shift factor ($a_T$) in preparation of a master curve showing the dependency of melt complex viscosity at 190° C. (η; unit is Pa·second) on angular frequency (ω: unit is rad/second) based on the temperature-time superposition theory, and is a value which can be determined by the following method.

Namely, each of curves of the melt complex viscosity-angular frequency of the ethylene-α-olefin copolymer at temperatures (T, unit is ° C.) of 130° C., 150° C., 170° C. and 190° C., respectively, is superposed on the curve of the melt complex viscosity-angular frequency of the ethylene-α-olefin copolymer at 190° C. based on the temperature-time superposition theory, to obtain a shift factor ($a_T$) at each of the temperatures (T), then a linear approximate equation of [ln ($a_T$)] and [1/(T+273.16)]{the following equation (I)} is calculated by least-square method from each of the temperatures and the shift factors at each of the temperatures, respectively. Next, Ea is determined from a slope m of the linear equation and the following equation (II).

$$\ln(a_T) = m(1/(T+273.16)) + n \quad (I)$$

$$Ea = |0.008314 \times m| \quad (II)$$

$a_T$: Shift factor
Ea: Activation energy of flow (unit: kJ/mol)
T: Temperature (unit: ° C.)

The above-described calculation may be determined using a commercially available software for a computer, and as the soft ware, for example, Rhinos V.4.4.4 (manufactured by Rheometrics Limited) can be listed.

Herein, the shift factor ($a_T$) is a shifted amount at which double logarithmic curves of melt complex viscosity-angular frequency at each of the temperatures is shifted to the direction of log(Y)=−log(X) axis (Y axis: melt complex viscosity, X axis: angular frequency) to superimpose on the curve of melt complex viscosity-angular frequency at 190° C., and in the superposition, each of the double logarithmic curves of melt complex viscosity-angular frequency at the respective temperature is shifted $a_T$ times in the angular frequency and 1/aT times in the melt complex viscosity. Further, the coefficient of correlation is usually 0.99 or more when the equation (I) is determined by a least-square method from values of 4 points of 130° C., 150° C., 170° C. and 190° C.

The measurement of the melt complex viscosity-angular frequency curve is usually carried out using a viscoelasticity measuring apparatus (e.g. Rheometrics Mechanical Spectrometer RMS-800 manufactured by Rheometrics, Limited) under the following conditions:

(1) Geometry; parallel plate,
(2) Diameter of plate; 25 mm,
(3) Distance between plates; 1.5 to 2 mm,
(4) Strain: 5%, and
(5) Angular frequency; 0.1 to 100 rad/second In addition, the measurement is carried out under a nitrogen atmosphere and it is preferable to add previously an antioxidant in a proper amount (e.g. 1000 wt-ppm) to the sample to be measured.

The ethylene-α-olefin copolymer of the present invention has a molecular weight distribution of preferably 3 or more, more preferably 5 or more, further preferably from 6 or more, and most preferably 7 or more, from the viewpoint of improvement of moldability, particularly reduction of extrusion load. On the other hand, the molecular weight distribution is preferably 25 or less, more preferably 20 or less, most preferably 15 or less, from the viewpoint of enhancement of mechanical strength of molded articles to be obtained.

The above-mentioned molecular weight distribution is a value obtained by calculating the weight-average molecular weight (Mw) and the number-average molecular weight (Mn) each converted into polystyrene molecular weight obtained by the above-mentioned gel permeation chromatography measurement, and dividing Mw by Mn (Mw/Mn).

Furthermore, as measurement conditions, for example, the following conditions are illustrated:

(1) Apparatus: Waters 150C (manufactured by Water limited)
(2) Separation column: TOSOH TSKgelGMH-HT
(3) Measurement temperature: 140° C.
(4) Carrier: o-dichlorobenzene
(5) Flow amount: 1.0 mL/minute
(6) Injection amount: 500 μL
(7) Detector: differential refraction
(8) Standard substance of molecular weight: standard polystyrene The ethylene-α-olefin copolymer of the first invention has a melt follow rate (MFR) of usually from 0.01 to 4 g/10 minutes. The MFR is preferably 0.05 g/10 minutes or more, more preferably 0.1 g/10 minutes or more from the viewpoint of enhance of optical properties of molded articles obtained from a resin composition of a conventional ethylene-α-olefin copolymer therewith. On the other hand, the MFR is preferably 3 g/10 minutes or less from the viewpoint of improving mechanical strength of molded articles. The MFR is a value measured under a load of 21.18 N (2.16 Kg) at 190° C. according to A-method in JIS K7210-1995. Further, when the MFR is measured, the ethylene-α-olefin copolymer to which an antioxidant has been previously added in an amount of about 1000 wt-ppm, is used.

The relaxation time (τ, unit: second) of the first ethylene-α-olefin copolymer of the present invention satisfies the following equation (1):

$$3 \times MFR^{-0.75} + 1.1 > \tau > 1.3 \times MFR^{-0.5} + 1.4 \quad (1),$$

wherein the MFR is as defined before.

The characteristic relaxation time (τ) is a numeral value showing a length of the long chain branching in which the ethylene-α-olefin copolymer has, and when the length of the long chain branching is short, the value of the τ becomes small, on the other hand, when the length of the long chain branching is long, the value of the τ becomes large. In addition, the characteristic relaxation time (τ) is affected on the molecular weight of the ethylene-α-olefin copolymer, and in general, when the molecular weight becomes high (the MFR becomes small), the value of the characteristic relaxation time (τ) has a tendency to become large even if the length of the long chain branching is not changed. Accordingly, the characteristic relaxation time (τ) is evaluated as a function of the molecular weight, herein, of the MFR.

The characteristic relaxation time (τ) is a value calculated by preparing a master curve by superimposing curves of the melt complex viscosity-angular frequency of the ethylene-α-olefin copolymer at respective temperatures (T, unit is °C.) of 130° C., 150° C., 170° C. and 190° C. measured for determination of the activation energy of flow (Ea) on the melt complex viscosity-angular frequency at 190° C. based on the temperature-time superposition theory, then approximating the master curve with the following equation (III):

$$\eta = \eta_0/[1+(t \times \omega)^n]$$ (III)

η; Melt complex viscosity (unit: Pa·second),
ω; Angular frequency (unit: rad/second),
τ; Characteristic relaxation time
$\eta_0$; Constant determined in each ethylene-α-olefin copolymer (unit: Pa·second),
n; Constant determined in each ethylene-α-olefin copolymer In addition, the above-described calculation may be determined by using a commercially available software for a computer, and as the soft ware, for example, Rhinos V.4.4.4 (manufactured by Rheometrics Limited) can be listed.

From the viewpoint of enhancement of optical properties of molded articles obtained, the characteristic relaxation time (τ) of the first ethylene-α-olefin copolymer of the present invention satisfies preferably the following formula (1'), more preferably the following formula (1"):

$$2.9 \times MFR^{-0.75} + 1.1 > \tau > 1.33 \times MFR^{-0.5} + 1.4$$ (1')

$$2.8 \times MFR^{-0.75} + 1.1 > \tau > 1.36 \times MFR^{-0.5} + 1.4$$ (1")

The second ethylene-α-olefin copolymer of the present invention has a melt flow rate (MFR) of usually from 0.01 to 100 g/10 minutes. The MFR is preferably 0.05 g/10 minutes or more, more preferably 0.1 g/10 minutes or more from the viewpoint of enhance of optical properties of molded articles obtained from a resin composition of a conventional ethylene-α-olefin copolymer therewith. On the other hand, the MFR is preferably 15 g/10 minutes or less, more preferably 10 g/10 minutes or less, further preferably 5 g/10 minutes or less from the viewpoint of enhance of optical properties of molded articles obtained from a resin composition of a conventional ethylene-α-olefin copolymer therewith. The MFR is a value measured under a load of 21.18 N (2.16 Kg) at 190° C. according to A-method in JIS K7210-1995. Further, when the MFR is measured, the ethylene-α-olefin copolymer to which an antioxidant has been previously added in an amount of about 1000 wt-ppm, is used.

The second ethylene-α-olefin copolymer of the present invention is a polymer having a small external haze ratio (EHR) compared to that of a conventionally known ethylene-α-olefin copolymer excellent in moldability and satisfies the following formula (2):

$$EHR \leq -15 \times \log MFR + 0.145 \times d - 47$$ (2), wherein EHR is an external haze ratio, MFR is a melt flow rate (unit; g/10 minutes) of the ethylene-α-olefin copolymer and d is a density (unit; kg/m$^3$).

The external haze ratio (EHR) shows a uniformity of deformation in elongational deformation in a molten state of the ethylene-α-olefin copolymer. Namely, it is contemplated that when a molten ethylene-α-olefin copolymer discharged from a dice is drawn and solidified by cooling to form a film, ultrafine uneven elongation (a part sufficiently elongated and a part not sufficiently elongated) is generated on a molten ethylene-α-olefin copolymer, and ultrafine unevenness is generated on the surface because the ultrafine uneven elongation is solidified as it is, leading to deterioration of transparency of a film obtained (the external haze of the film becomes high).

The uniformity of deformation in elongational deformation in a molten state of the ethylene-α-olefin copolymer is evaluated by the external haze ratio (EHR) determined using a method described below.

The EHR is evaluated under equivalent molecular weight and crystallinity, herein, as functions of a melt flow rate and density because the unevenness on the film surface is affected on not only unevenness generated by uneven elongation of the molten ethylene-α-olefin copolymer but also unevenness of the molten ethylene-α-olefin copolymer caused by the molecular weight thereof at the time that the copolymer is discharged from a dice and unevenness caused by crystal of the ethylene-α-olefin copolymer.

The external haze ratio (EHR) of the ethylene-α-olefin copolymer is calculated by the below-described equation from a haze value (Haze) and an inner haze value (Inner haze) of an blown film obtained by forming the blown film of 50 μm-thick under conditions described below using an inflation molding machine. In addition, the inner haze is a haze measured in a state under which an influence of unevenness on film surface is eliminated, for example, the inner haze is measured under a condition under which the copolymer is immersed in a transparent cell filled with methyl phthalate.

$$EHR = [(Haze - Internal\ haze)/Haze] \times 100$$

Forming conditions

Dice: Die diameter; 50 mmφ, lip gap; 0.8 mm

Forming temperature: 170° C.

Airing: Double slit airing

Air temperature for cooling: 25° C.

Height of frost line: 200 mm

Blow ratio: 1.8

Take off rate: 7.2 m/minute

Extruder: Single screw extruder, diameter; 30 mmφ, L/D; 28, full flight type

It is considered that when the ethylene-α-olefin copolymer is subjected to stretch deformation in a molten state, the nonuniform deformation is caused by differences in molecular weights, differences in long chain branching structures (e.g. number, length, branching) and/or differences in contents of monomer units, among the copolymer components constituting the ethylene-α-olefin copolymer. Further, it is thought that an ethylene-α-olefin copolymer having a high uniformity in the deformation when deformed by stretching in the molten state, has a narrow distribution in molecular weights, in long chain branching structures (e.g. number, length, branching) and/or in contents of monomer units in total, of the copolymer components constituting the ethylene-α-olefin copolymer.

The external haze ratio (EHR) of the ethylene-α-olefin copolymer of the second invention satisfies preferably the formula (2'), more preferably the formula (2"), most preferably the formula (2'") from the viewpoint of improvement of an optical property of a molded article obtained from a resin composition of a conventional ethylene-α-olefin copolymer therewith.

$$EHR \leq -15 \times \log MFR + 0.145 \times d - 47.2 \quad (2')$$

$$EHR \leq -15 \times \log MFR + 0.145 \times d - 47.4 \quad (2'')$$

$$EHR \leq -15 \times \log MFR + 0.145 \times d - 47.6 \quad (2''')$$

A melt flow rate ratio (MFRR) of the ethylene-α-olefin copolymer of the present invention is, from the viewpoint of improvement of moldability, particularly reduction of extrusion load, preferably 60 or more. Further, the MFRR is usually 210 or less, preferably 190 or less from the viewpoint of heightening of strength of molded articles, more preferably 170 or less. The MFRR is a value obtained by dividing a melt flow rate value measured at 190° C. under a load of 211.82 N (21.60 kg) (MFR-H, unit: g/10 minute) according to JIS K7210-1995 by an MFR measured at 190° C. under a load of 21.18 N (2.16 kg) according to JIS K7210-1995. For the above-mentioned melt flow rate measurement, a polymer to which about 1000 wt-ppm of an antioxidant has been previously added is usually used.

A method for producing the ethylene-α-olefin copolymer of the present invention suitably includes a method in which ethylene and an α-olefin are copolymerized with a solid catalyst component obtained by supporting a catalyst component on a fine particle-like support. For example, when a metallocene complex (transition metal compound having a cyclopentadienyl type anion skeleton) is used, a co-catalyst support prepared by supporting a compound (for example, an organic aluminumoxy compound, boron compound, and organozinc compound) which can form an ionic complex through ionization of the metallocene complex can be used.

As the fine particle-like support, a porous material is preferable, and inorganic oxides such as SiO2, AlO3, MgO, ZrO2, TiO2, B2O3, CaO, ZnO, BaO, and ThO2; clays and clay minerals such as smectite, montmorillonite, hectrite, raponite and saponite; and organic polymers such as polyethylene, polypropylene and styrene-divinylbenzene copolymer are used.

A 50% volume-average particle diameter of the fine particle-like support is usually 10 to 500 μm, the 50% volume-average particle diameter is measured by a light scattering type laser diffraction method. Further, a micro porous volume of the fine particle-like support is usually 0.3 to 10 ml/g and the micro porous volume is mainly measured by a gas adsorption method (BJH method). A specific surface area of the fine particle-like support is usually 10 to 1000 m²/g and is measured by the gas adsorption method (BET method).

A production process of the ethylene-α-olefin copolymer of the present invention, includes a method of copolymerizing ethylene and an α-olefin in the presence of a polymerization catalyst prepared by contacting a co-catalyst support (A) described below, a metallocene complex (B) having a ligand having a structure in which two cyclopentadienyl type anion skeletons are connected each other through a bridging group such as an alkylene group or a silylene group, and an organoaluminum compound (C). The above-described co-catalyst support (A) is a support obtained by contacting diethyl zinc as a component (a); two kinds of fluorinated phenols as a component (b), water as a component (c), inorganic fine particle-like support as a component (d) and trimethyldisilazane $(((CH_3)_3)Si)_2NH)$ as a component (e).

Examples of the fluorinated phenols (b) include pentafluorophenol, 3,5-difluorophenol, 3,4,5-trifluorophenol and 2,4,6-trifluorophenol. Further, from the viewpoint of heightening of the activation energy of flow (Ea) of the ethylene-α-olefin copolymer obtained, it is preferable to use a combination of two kinds of phenols having different numbers of fluorine each other (e.g. pentafluorophenol/3,4,5-trifluorophenol, pentafluorophenol/2,4,6-trifluorophenol, pentafluorophenol/ 3,5-difluorophenol), and preferably a combination of pentafluorophenol with 3,4,5-trifluorophenol.

The molar ratio of a fluorinated phenol having a large number of fluorine to that having a small number of fluorine is 20/80 to 80/20. From the viewpoint of reduction of the external haze ratio (EHR), the molar ratio is preferably larger, and more preferably 50/50 or more.

The inorganic particle-like support as the component (d) is preferably silica gel.

The amounts of the above-mentioned components (a), (b) and (c) are not particularly restricted, and when the molar ratio (a):(b):(c) of the amounts used of the components is 1:x:y, it is preferable that x and y satisfy the following formula:

$$|2-X-2y| \leq 1$$

In the above-mentioned formula, x represents a number of preferably from 0.01 to 1.99, more preferably from 0.10 to 1.80, further preferably from 0.20 to 1.50, most preferably from 0.30 to 1.00.

Regarding the used amount of (d) based on (a), the amount of a zinc atom derived from (a) contained in particles obtained by contact of (a) with (d) is preferably 0.1 mmol or more, more preferably 0.5 to 20 mmol in terms of molar number of zinc atoms contained in 1 g of the resulted particle. Regarding the amount of (e) based on (d), the amount of (e) is preferably 0.1 mmol or more, more preferably 0.5 to 20 mmol per g of (d).

As a metal of (B) the metallocene complex having a structure in which two ligands having a cyclopentadiene skeleton are connected each other through a bridging group such as an alkylene group or silylene group, metals of Group 4 of the Periodic Table of the Elements are preferable, and zirconium and hafnium are more preferable.

Further, examples of the ligand having a cyclopentadiene skeleton include preferably an indenyl group, methylindenyl group, methylcyclopentadienyl group and dimethylcyclopentadienyl group, and examples of the bridging group include preferably an ethylene group, dimethylmethylene group and dimethylsilylene group. Furthermore, the remaining two groups bonded to the metal, include preferably, for example, a phenoxy group or alkoxy group.

As the metallocene complex (B), ethylenebis(1-indenyl) zirconium diphenoxide is preferably illustrated.

The organoaluminum compound (C) is preferably triisobutylaluminum or tri-n-octylaluminum.

The use amount of the metallocene complex (B) is preferably $5 \times 10^{-6}$ to $5 \times 10^{-4}$ mol per g of the co-catalyst support (A). The amount of the organoaluminum compound (C) is preferably from 1 to 2000 in terms of the ratio (Al/M) of the molar number of an aluminum atom (Al) in the organoaluminum compound (C) to the molar number of the metal atom (M) in the metallocene complex (B).

In the polymerization catalyst described above prepared by contacting the components (A), (B) and (C), if necessary, an electron donor (D) may be contacted in addition thereto. From the viewpoint of shortening of the characteristic relaxation time τ in the case of which the MFR is constant, it is preferable to use the electron donor (D).

The electron donor (D) is preferably triethylamine or tri-n-octylamine.

From the viewpoints of broadening of the molecular weight distribution and reducing the external haze ratio (EHR), it is preferable to use the electron donor (D), and the used amount of the (D) is preferably 0.1 mol % or more per mole of Al atom in the organoaluminum compound (C), more preferably 1 mol % or more. On the other hand, from the viewpoint of heightening the polymerization activity, the amount is preferably 10 mol % or less, more preferably 5 mol % or less.

As a production method of the ethylene-α-olefin copolymer, it is preferable to copolymerize ethylene and an α-olefin using a prepolymerization solid component obtained by polymerizing an olefin in a small amount, for example, a prepolymerization solid component obtained by subjecting an olefin to prepolymerization using the co-catalyst support, the metallocene complex and other co-catalyst components (e.g. an alkylating agent such as an organoaluminum compound) as a catalyst component or a catalyst.

Examples of the olefin used in the prepolymerization include ethylene, propylene, 1-butene, 1-pentene, 1-hexene, 1-octene, 4-methyl-1-pentene, cyclopentene and cyclohexene, and these may be used alone or in combination of 2 or more. A content of a prepolymerized polymer in a prepolymerization solid component is usually 0.1 to 500 g, preferably 1 to 200 g per 1 g of the solid catalyst component.

As the prepolymerization method, a continuous polymerization method and batch polymerization method may be applied, for example, a batch slurry polymerization, a continuous slurry polymerization and continuous gas phase polymerization are listed.

As a charging method of catalyst components such as the co-catalyst support, metallocene complex, and other co-catalyst component(s) (for example, alkylation agent (e.g. an organoaluminum compound) into a polymerization vessel, in usual, a method of charging these under a water-free condition with an inert gas such as nitrogen or argon, hydrogen, ethylene or the like, or a method of charging the respective components in a form of a solution or slurry after the respective components have been dissolved, dispersed or diluted with a solvent.

Further, in the prepolymerization, as a charging method of catalyst components into the polymerization vessel, it is preferable to charge respective components so that a contact-treated product prepared by contact-treating a contact-treated product of a co-catalyst support with a metallocene complex with the other co-catalyst component, forms a prepolymerization catalyst, for example, (1) a method of charging the other component into the polymerization vessel after the co-catalyst support and the metallocene complex have been charged into the vessel, (2) a method of charging a contact-treated product which has been obtained by contact-treating the co-catalyst support with the metallocene, into the polymerization vessel, subsequently charging the other component thereinto, (3) a method of charging a contact-treated product which has been obtained by contact-treating the co-catalyst support with the metallocene, into the polymerization vessel in which the other component has been charged, (4) a method of charging a contact-treated product prepared by contact-treating a contact-treated product of a co-catalyst support with a metallocene complex, with the other co-catalyst component, forms a prepolymerization catalyst, and the like, are illustrated.

The contact-treatment of the co-catalyst support with the metallocene complex is preferably carried out in an inert solvent such as an aliphatic hydrocarbon (e.g. butane, pentane, hexane, octane) and an aromatic hydrocarbon (e.g. benzene, toluene) or the like, and the contact-treatment temperature is preferably 50 to 100° C. from the view point of enhancement of the optical properties.

The prepolymerization temperature is usually below a melting point of the prepolymerized polymer, preferably 0 to 100° C., more preferably 10 to 70° C.

When the prepolymerization is carried out by slurry polymerization, specific examples of a solvent used includes aliphatic hydrocarbons such as propane, n-butane, iso-butane, n-pentane, iso-pentane, n-hexane cyclohexane, heptane, octane and decane; and aromatic hydrocarbons such as benzene, toluene and xylene, and these are used alone or in combination of two or more kinds.

As a production process of the ethylene-α-olefin copolymer, a continuous polymerization method accompanying formation of particles of the ethylene-α-olefin copolymer, is preferable, for example, a continuous gas phase polymerization process, a continuous slurry polymerization method and continuous bulk polymerization method are preferable, among them, a continuous gas phase polymerization process is most preferable. Gas phase polymerization equipment to be used usually contains a fluidized bed polymerization vessel, preferably contains gas phase polymerization equipment having an enlarged portion, and stirring blades may be installed in the vessel.

As a supplying method of the prepolymerized solid catalyst component in the continuous polymerization vessel accompanying formation of particles of the ethylene-α-olefin copolymer, in usual, a method of feeding under a water free condition with an inert gas such as nitrogen or argon, hydrogen, ethylene or the like, or a method of supplying the respective components in a form of a solution or slurry after the respective components have been dissolved, dispersed or diluted with a solvent.

The temperature for the polymerization accompanying formation of particles of the ethylene-α-olefin copolymer, is usually below the melting temperature of the copolymer, preferably 0 to 150° C., more preferably 30 to 100° C.

Further, the temperature is preferably below 90° C., specifically preferably 70 to 87° C., more preferably 70 to 85° C., further preferably 72 to 80° C. from the viewpoint of lowering the external haze ratio of the ethylene-α-olefin copolymer of the present invention. Furthermore, hydrogen may be added as a molecular weight regulator for the purpose of controlling a melt flowability of the ethylene-α-olefin copolymer to be produced. Moreover, an inert gas in the mixed gas of monomers may be coexisted. When the prepolymerized solid catalyst is used, the co-catalyst component such as organoaluminum compound may be properly used.

In the production of the ethylene-α-olefin copolymer of the present invention, it is preferable that the process contains a step of kneading an ethylene-α-olefin copolymer obtained by polymerization with (1) an extended flow kneading die, for example, a die developed by Utracki et al and disclosed in U.S. Pat. No. 5,451,106, (2) an extruder equipped with counter-rotating twin screws having a gear pump, and preferably with a retention part between the screw and die, or the like.

The ethylene-α-olefin copolymer of the present invention may optionally contain known additives. Examples of the additives include antioxidants, weather resistant agents, lubricants, anti-blocking agents, antistatic agents, defogging agents, non-dripping agents, pigments, fillers and the like.

The ethylene-α-olefin copolymer of the present invention is molded to various shaped articles (e.g. films, sheets, bottles, trays) by various known molding methods, for example, extruding molding methods (e.g. inflation film molding, T-die film forming), injection molding, compression molding, and the like. As the molding method, an extrusion molding is preferably applied, and extrusion molded articles are applied to a wide variety of uses such as food packaging and surface protection.

The ethylene-α-olefin copolymer of the present invention (hereinafter, referred to as "ethylene-α-olefin copolymer (A)") is preferably used as a composition of an ethylene-α-olefin copolymer (hereinafter, referred to as ethylene-α-olefin copolymer (B)) obtained by copolymerizing ethylene and the α-olefin in the presence of a catalyst containing titanium, magnesium and a halogen therewith because a molded article superior in optical properties.

The ethylene-α-olefin copolymer (B) is an ethylene-α-olefin copolymer having monomer units derived from ethylene and monomer units derived from an α-olefin of 3 to 20 carbon atoms.

Examples of the α-olefin include propylene, 1-butene, 1-pentene, 1-hexene, 1-heptene, 1-octene, 1-nonene, 1-decene, 1-dodecene, 4-methyl-1-pentene and 4-methyl-1-hexene, and these may be used alone or in combination of 2or more. 1-hexene and 4-methyl-1-pentene are preferred.

Examples of the ethylene-α-olefin copolymer (B) include an ethylene-1-hexene copolymer, ethylene-4-methyl-1-pentene copolymer, ethylene-1-octene copolymer, ethylene-1-butene-1-hexene copolymer, ethylene-1-butene-4-methyl-1-pentene copolymer and ethylene-1-butene-1-octene copolymer, preferably an ethylene-1-hexene copolymer, ethylene-4-methyl-1-pentene copolymer, ethylene-1-butene-1-hexene copolymer and ethylene-1-butene-4-methyl-1-pentene copolymer, more preferably an ethylene-1-hexene copolymer and ethylene-1-butene-1-hexene copolymer.

The ethylene-α-olefin copolymer (B) has a melt flow rate (MFR) of usually from 0.05 to 30 g/10 minutes. The MFR is preferably 0.1 g/10 minutes or more, more preferably 0.5 g/10 minutes or more from the viewpoint of reduction of extrusion load. On the other hand, the MFR is preferably 10 g/10 minutes or less, preferably 5 g/10 minutes or less from the viewpoint of improvement of a melt tension and mechanical strength of molded articles. The MFR is a value measured under a load of 21.18 N (2.16 Kg) at 190° C. according to A-method in JIS K7210-1995. Further, when the MFR is measured, the ethylene-α-olefin copolymer to which an antioxidant has been previously added in an amount of about 1000 wt-ppm, is used.

The ethylene-α-olefin copolymer (B) has a density of 900 to 970 kg/m$^3$, the density is preferably 905 kg/m$^3$ or more from the viewpoint of improving rigidity of molded articles, more preferably 910 kg/m$^3$ or more. On the other hand, the density is preferably 940 kg/m$^3$ or less from the viewpoint of improving a impact strength of molded articles, more preferably 930 kg/m$^3$ or less. The density of the copolymer is measured according to A-method in JIS K7112-1980 after annealed according to JIS K6760-1995.

The Ea of the ethylene-α-olefin copolymer (B) is lower than 50 kJ/mol, preferably 40 kJ/mol or less and more preferably 35 kJ/mol from the viewpoint of enhancement of optical properties and mechanical strength of molded articles. In addition, the Ea is measured by the above-described method.

The ethylene-α-olefin copolymers (B) can be obtained by copolymerizing ethylene and the α-olefin in the presence of a catalyst containing a solid catalyst component containing titanium, magnesium and a halogen (herein-after referred to as "Zieglar-Natta catalyst"). The Zieglar-Natta catalyst includes a polymerization catalyst containing a solid catalyst component containing titanium, magnesium and a halogen and optionally an electron donor (inner donor), an organoaluminum compound and optionally an electron donor (outer donor).

As the solid catalyst component containing titanium, magnesium and a halogen, there can be listed, for example, JP46-34092 B, JP47-41675 B, JP55-23561 B, JP57-24361 B, JP52-39431 B, JP52-36786 B, JP01-28049 B, JP03-43283 B, JP04-80044 A, JP55-52309 A, JP58-21405 A, JP61-181807 A, JP63-142008 A, JP05-339319 A, JP54-148093 A, JP04-227604 A, JP06-2933 A, JP64-6006 A, JP06-179720 A, JP07-116252 B, JP08-134124 A, JP09-31119 A, JP11-228628 A, JP11-80234 A and JP11-322833 A.

Among them, the solid catalyst component containing the electron donor in addition to titanium, magnesium and a halogen, is preferable.

Available examples of the electron-donor compound include: oxygen-containing electron donors such as alcohols, phenols, ketones, aldehydes, carboxylic acids, esters of organic acids or inorganic acids, ethers, acid amides, acid anhydrides and nitrogen-containing electron donors such as ammonia, amines, nitriles, isocyanates and the like. Among these electron donors, esters of inorganic acids and ethers are preferably used.

As the ester compound, mono- and poly-valent carboxylic acid esters are preferable, and examples thereof include saturated aliphatic carboxylic acid esters, unsaturated aliphatic carboxylic acid esters, alicyclic carboxylic acid esters and aromatic carboxylic acid esters. Specific examples thereof include methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, n-butyl benzoate, methyl toluate, ethyl toluate, ethyl anisate, diethyl succinate, di-n-butyl succinate, diethyl malonate, di-n-butyl malonate, dimethyl maleate, di-n-butyl maleate, diethyl itaconate, di-n-butyl itaconate, monoethyl phthalate, dimethyl phthalate, methylethyl phthalate, diethyl phthalate, di-n-propyl phthalate, diisopropyl phthalate, di-n-butyl phthalate, diisobutyl phthalate, di-2-ethylhexyl phthalate, di-n-octyl phthalate, diphenyl phthalate and the like.

Specific examples of the organoaluminum compound include trialkylaluminums such as triethylaluminum, tri-n-butylaluminum, triisobutylaluminum, tri-n-hexylaluminum and the like, dialkylaluminum halides such as diethylaluminum chloride, di-n-butylaluminum chloride, diisobutylaluminum chloride and the like, alkylaluminum dihalides such as ethylaluminum dichloride, n-butylaluminum dichloride, isobutylaluminum dichloride and the like, and a mixture of a trialkylaluminum and a dialkylaluminum.

As the specific examples of the Zieglar-Natta polymerization catalyst, there can be listed polymerization catalysts described in JP01-263102 A, JP05-117317 A, JP07-292028 A and JP09-169810 A.

The ethylene-α-olefin copolymer (B) can be produced according to publicly known process such as a liquid phase polymerization, slurry polymerization, gas phase polymerization or high-pressure ionic polymerization. These processes may be any of a batch method or continuous method, further a multi-stage polymerization composed of 2 or more of stages. In addition, commercially available products corresponding to the ethylene-α-olefin copolymer (B) may be used.

In a resin composition containing the ethylene-α-olefin copolymer (A) and the ethylene-α-olefin copolymer (B), the content of the ethylene-α-olefin copolymer (A) is 5% by weight or more (95% by weight or less of the ethylene-α-olefin copolymer (B)) based on 100% by weight of the total of the ethylene-α-olefin copolymer (A) and the ethylene-α-olefin copolymer (B), preferably 10% by weight or more (90% by weight or less of the ethylene-α-olefin copolymer (B)) from the viewpoint of enhancement of optical properties.

On the other hand, the content of the ethylene-α-olefin copolymer (A) is 95% by weight or less (5% by weight or more of the ethylene-α-olefin copolymer (B)) based on 100% by weight of the total of the ethylene-α-olefin copolymer (A) and the ethylene-α-olefin copolymer (B), preferably 70% by weight or less (30% by weight or more of the ethylene-α-olefin copolymer (B)), more preferably 50% by weight or less (50% by weight or more of the ethylene-α-olefin copolymer (B)) from the viewpoint of enhancement of optical properties.

The resin composition is molded to various molded articles (e.g. films, sheets, bottles, trays), preferably films by various known-molding methods, for example, extruding molding methods (e.g. inflation film molding, T-die film forming), injection molding, compression molding, and the like. As the molding method, an extrusion molding is preferably applied, and extrusion molded articles, particularly films, are applied to a wide variety of uses such as food packaging and surface protection.

EXAMPLE

The present invention is explained in detail by Examples and Comparative Examples below.

Physical properties in Examples and Comparative Examples were measured by the following methods:

[Physical Properties and Structures of Polymer]

(1) Melt Flow Rate (MFR)

It was measured by A-method under conditions of 190° C. and a load of 21.18N according to JIS K7210-1995.

(2) Melt Flow Rate Ratio (MFRR)

The melt flow rate ratio (MFRR) is a value obtained by dividing a melt flow rate value measured at 190° C. under a load of 211.82 N (21.60 kg) by a melt flow rate value measured under a load of 21.18 N (2.16 kg) according to JIS K7210-1995. For the above-mentioned melt flow rate measurement, the polymer to which 1000 wt-ppm of an antioxidant (Irganox@ 1076 manufactured by Ciba Specialty Chemicals, Ltd.) had been previously added, was used.

(3) Density (Unit: $kg/m^3$)

The density of a polymer was measured according to A method in JIS K7112-1980 after annealed according to JIS K6760-1995.

(4) Molecular Weight Distribution (Mw/Mn)

A weight-average molecular weight (Mw) and number-average molecular weight (Mn) were measured using a gel permeation chromatography (GPC) under conditions (i) to (viii) below, and Mw/Mn was determined.

A base line in a chromatogram was set by a straight line, of which a point in a stable horizontal region with a retention time sufficiently shorter than the one of a sample elution peak appeared was connected with a point in a stable horizontal region with a retention time sufficiently longer than the one of a solvent elution peak observed.

(i) Apparatus: Waters 150C (manufactured by Water limited)
(ii) Separation column: TOSOH TSKgelGMH-HT
(iii) Measurement temperature: 140° C.
(iv) Carrier: o-dichlorobenzene
(v) Flow amount: 1.0 mL/minute
(vi) Injection amount: 500 μL
(vii) Detector: differential refraction
(viii) Standard substance of molecular weight: standard polystyrene (5) Activation Energy of Flow (Ea, Unit: kJ/mol)

Melt complex viscosities and angular frequencies at 130° C., 150° C., 170° C. and 190° C. were measured under the following conditions using a viscoelasticity measuring apparatus (Rheometrics Mechanical Spectrometer RMS-800 manufactured by Rheometrics, Limited) to prepare a melt complex viscosities-angle frequency curve. From the curve obtained, a master curve of melt complex viscosities-angular frequency at 190° C. was prepared using a computer software Rhios V.4.4.4 (manufactured by Rheometrics, Limited) and the activation energy (Ea) was determined.

<Measurement Condition>
Geometry: parallel plate
Plate diameter: 25 mm
Plate distance: 1.5 to 2 mm
Strain: 5%
Angle frequency: 0.1 to 100 rad/minute
Measurement atmosphere: nitrogen (6) Characteristic Relaxation Time (τ, Unit: Second)

It was determined from the master curve of melt complex viscosities-angular frequency at 190° C. prepared in (5) described above using the computer software Rhios V.4.4.4 (manufactured by Rheometrics, Limited).

(7) External Haze Ratio (EHR)

An inflation film of 50 μm-thick was formed under conditions of a forming temperature of 170° C., an extruded amount of 5.5 kg/hr, a frost line distance (FLD) of 200 mm, a blowing ratio of 1.8, taking off speed of 7.2 m/minute and a cooling air temperature of 25° C. using an inflation film forming machine [manufactured by Placo, Ltd. full flight type single screw extruder (screw diameter of 30 mmφ, L/D=28), and a dice (die diameter of 50 mmφ, lip gap of 0.8 mm), double slit airing]. A haze (Haze, unit; %) of the obtained inflation film was measured according to ASTM1003.

The film was immersed in a cell filled with methyl phthalate, then, a haze (inner haze, unit: %) of the film was measured under a condition in which the film was immersed with methyl phthalate. The external haze ratio (EHR) of the ethylene-α-olefin copolymer is calculated by the below-described equation from a haze value (Haze) and an internal haze value (Internal haze).

EHR=[(Haze−Internal haze)/Haze]×100

(8) Optical Property of Blown Film

A blown film of 20 μm-thick was formed by using a resin composition obtained by dry-blending 20 parts by weight of the ethylene-α-olefin copolymer in Example or Comparative Example described below with 80 parts by weight of a commercially available ethylene-α-olefin copolymer (manufactured by Sumitomo Chemical Company, Limited, Sumikathene L FS150 produced with a Zieglar-Natta type polymerization catalyst) under conditions of a forming temperature of 200° C., an extruded amount of 25 kg/hr, a frost line distance (FLD) of 250 mm, a blowing ratio of 1.8, taking off speed of 30 m/minute and a cooling air temperature of 25° C. using a blown film molding machine [manufactured by Placo, Ltd., single screw extruder (screw diameter of 50 mmφ, L/D=28), and a dice (die diameter of 125 mmφ, lip gap of 2.0 mm), single slit airing with an iris]. A haze (Haze, unit; %) of the obtained blown film was measured according to ASTM1003.

When the haze is smaller, the optical property of the film is more excellent.

(9) Resin Pressure (Unit: MPa)

When the inflation film of 50 μm-thick was formed under conditions of a forming temperature of 170° C., an extruded amount of 5.5 kg/hr, a frost line distance (FLD) of 200 mm, a blow up ratio of 1.8, taking off speed of 7.2 m/minute and a cooling air temperature of 25° C. using an inflation film forming machine [manufactured by Placo, Ltd. full flight type single screw extruder (screw diameter of 30 mmφ, L/D=28), and a dice (die diameter of 50 mmφ, lip gap of 0.8 mm), double slit airing], the resin pressure of the extruder was measured.

When the resin pressure is lower, the formability is more excellent.

Example 1

(1) Preparation of Co-Catalyst Support

Into a reactor equipped with a stirrer, purged with nitrogen were charged 2.8 kg of silica (Sylopol 948 manufactured by Devison, Ltd; average particle size=55 μm; pore volume=1.67 ml/g; specific surface area=325 m$^2$/g) heat-treated at 300° C. under a nitrogen flow and 24 kg of toluene, then the resulting mixture was stirred. The mixture was cooled to 5° C., then, a mixed solution of 0.91 kg of 1,1,1,3,3,3-hexamethyldisilazane and 1.43 kg of toluene was added thereto dropwise over 33 minutes while keeping 5° C. After completion of the dropping, the mixture was stirred at 5° C. for 1 hour, then at 95° C. for 3 hours after heated to 95° C. and filtrated. Thus obtained solid was washed six times with each toluene of 21 kg. Thereafter, 6.9 kg of toluene was added to obtain a slurry, then, the mixture was allowed to stand still overnight.

Into the slurry obtained above were charged 2.05 kg of a hexane solution of diethylzinc (diethylzinc concentration: 50 wt %) and 1.3 kg of hexane, then stirred. Thereafter, the mixture was cooled to 5° C., then a mixed solution of 0.77 kg of pentafluorophenol and 1.17 kg of toluene was added thereto dropwise over 61 minutes while keeping 5° C. After completion of the dropping, the mixture was stirred at 5° C. for 1 hour, then at 40° C. for 1 hour after heated to 400 C. Then, 0.11 kg of H$_2$O was dropped over 1.5 hours while keeping 5° C. After completion of the dropping, the mixture was stirred at 5° C. for 1.5 hours, additionally at 55° C. for 2 hours after heated to 55° C. Then, 1.4 kg of a hexane solution of diethylzinc (diethylzinc concentration: 50 wt %) and 0.8 kg of hexane were charged to the resultant. After cooled to 5° C., a mixed solution of 0.42 kg of 3,4,5-trifluorophenol and 0.77 kg of toluene was added dropwise over 60 minutes while keeping 5° C. of a temperature inside the reactor. After completion of the dropping, the resulting mixture was stirred at 5° C. for 1 hour, additionally at 40° C. for 1 hour after heated to 40° C. Thereafter, after the resulting mixture was cooled to 5° C., 0.077 kg of H$_2$O was added dropwise over 1.5 hours while keeping 5° C. of a temperature inside the reactor. After completion of the dropping, the resulted mixture was stirred at 5° C. for 1.5 hours, at 40° C. for 2 hours, additionally at 80° C. for 2 hours after heated to 80° C. After stirring, the supernatant liquid was removed so that the remainder became 16 L, 11.6 kg of toluene was added, then the resulting mixture was stirred. The mixture was heated to 95° C., then stirred for 4 hours. The mixture was allowed to stand still to cause precipitation of solid components, and the supernatant was removed to obtain a solid component. The solid obtained was washed 4 times with each toluene of 20.8 kg, then three times with each hexane of 24 L. Then, the solid was dried to obtain a solid component (hereinafter, referred to as "co-catalyst support (A)").

(2) Preparation of Prepolymerization Catalyst

Into a previously nitrogen-purged autoclave having a content volume of 210 L equipped with a stirrer were charged 80 l of butane, then 101 mmol of racemi-ethylenebis(1-indenyl) zirconium diphenoxide were charged therein, and the resulting mixture was heated to 50° C., then stirred for 2 hours. Next, the autoclave was cooled to 30° C. After the system was stabilized, ethylene was charged in an amount corresponding to 0.03 MPa of gas phase pressure in the autoclave, and 0.73 kg of the co-catalyst support (A) was charged, subsequently 139 mmol of triisobutylaluminum was charged therein to initiate polymerization.

After a lapse of 30 minutes, while continuously feeding 0.7 kg/hr of ethylene, 3.5 kg/hr of ethylene and hydrogen of 5.5 L converted under normal temperature and normal pressure were fed continuously with elevation of the temperature to 50° C. thereby carrying out the polymerization for 4 hours in total. After completion of the prepolymerization, ethylene, butane, hydrogen gas and the like were purged and the remaining solid was dried under vacuum at room temperature, to obtain a co-catalyst component in which 16 g of ethylene had been prepolymerized per 1 g of the above-mentioned co-catalyst support (A).

(3) Production of Ethylene-α-Olefin Copolymer

Using the prepolymerization catalyst component obtained above, copolymerization of ethylene and 1-hexene was carried out in a continuous type fluidized bed gas phase polymerization apparatus to obtain ethylene-1-hexene copolymer powder.

The polymerization conditions included a temperature of 75° C., a total pressure of 2 MPa, a molar ratio of hydrogen to ethylene of 1.7% and a molar ratio of 1-hexene to the total of ethylene and 1-hexene of 1.5%, and during the polymerization, ethylene, 1-hexene and hydrogen were continuously fed for maintaining the gas composition constant. Further, the above-mentioned prepolymerization catalyst component, triusobutylaluminum and triethylamine of 3% in terms of a molar ratio to triisobutylaluminum were fed continuously so as to maintain a total powder weight in the fluidized bed of 80 kg constant. The average polymerization time was 4 hours.

The powder of ethylene-1-hexene copolymer thus obtained was granulated by using an extruder (manufactured by Kobe Steel Ltd. LCM50) under conditions of a feed rate of 50 kg/hr, a screw rotation of 450 rpm, gate opening of 50%, suction pressure of 0.1 MPa, and resin temperature of 200 to 230° C. to obtain an ethylene-1-hexene copolymer. Properties of thus obtained ethylene-1-hexene copolymer were evaluated and the results were shown in Table 1.

Example 2

(1) Preparation of Prepolymerization Catalyst

Into a previously nitrogen-purged autoclave having a content volume of 210 L equipped with a stirrer were charged 80 L of butane, then 106 mmol of racemi-ethylenebis(1-indenyl) zirconium diphenoxide were charged therein, and the resulting mixture was heated to 50° C., then stirred for 2 hours. Next, 0.7 kg of the co-catalyst support (A) obtained in Example 1(1), was charged in the mixture and the autoclave was cooled to 30° C. After the system was stabilized, ethylene was charged in an amount corresponding to 0.03 MPa of gas phase pressure in the autoclave, and subsequently 158 mmol of triisobutylaluminum was charged therein to initiate polymerization.

After a lapse of 30 minutes, while continuously feeding at a rate of 0.7 kg/hr of ethylene, 3.5 kg/hr of ethylene and hydrogen of 5.5 L converted under normal temperature and normal pressure were fed continuously with elevation of the temperature to 51° C. thereby carrying out the polymerization for 4 hours in total. After completion of the prepolymerization, ethylene, butane, hydrogen gas and the like were purged and the remaining solid was dried under vacuum at room temperature, to obtain a co-catalyst component in which 15 g of ethylene had been prepolymerized per g of the above-mentioned co-catalyst support (A).

(2) Production of Ethylene-α-Olefin Copolymer

An ethylene-1-hexene copolymer was obtained in the same manner as in Example 1 (3) except that the prepolymerization catalyst component obtained in (1) described above was used, the polymerization temperature was 85° C., the molar ratio of hydrogen to ethylene was 1.7% and the molar ratio of 1-hexene to the total of ethylene and 1-hexene was 1.4%, Properties of thus obtained ethylene-1-hexene copolymer were evaluated and the results were shown in Table 1.

Example 3

(1) Preparation of Prepolymerization Catalyst

A prepolymerization catalyst component was prepared in the same manner as in Example 1(2) except that 106 mmol of racemi-ethylenebis(1-indenyl)zirconium diphenoxide and 158 mmol of triisobutylaluminum were used.

(2) Production of Ethylene-α-Olefin Copolymer

An ethylene-1-hexene copolymer was obtained in the same manner as in Example 1 (3) except that the prepolymerization catalyst component obtained in (1) described above was used, the polymerization temperature was 87° C., the molar ratio of hydrogen to ethylene was 1.2% and the molar ratio of 1-hexene to the total of ethylene and 1-hexene was 1.0%. Properties of thus obtained ethylene-1-hexene copolymer were evaluated and the results were shown in Table 1.

Example 4

(1) Preparation of Pre-Polymerization Catalyst Component

Into a previously nitrogen-purged reactor having a content volume of 210 L equipped with a stirrer were charged 80 L of butane, then 73 mmol of racemi-ethylenebis(1-indenyl)zirconium diphenoxide was charged therein, and the resulting mixture was heated to 50° C., then stirred for 2 hours. The inside temperature of the reactor was cooled to 30° C., and 0.1 kg of ethylene was charged therein.

Next, 661 g of the co-catalyst support (A) prepared in the same manner as in Example 1(1) was charged. Thereafter, 0.1 L of hydrogen converted under normal temperature and normal pressure was charged. After the system was stabilized, 105 mmol of triisobutylaluminum was charged therein to initiate polymerization.

After the initiation of the polymerization, the polymerization was carried out at a temperature in the inside of the reactor of 30° C. for 0.5 hour, then the temperature was elevated to heated to 50° C. over 30 minutes, subsequently the polymerization was carried out at 50° C. Ethylene at a rate of 0.7 kg/hr and 1.1 L of hydrogen converted under normal temperature and normal pressure were fed for first 0.5 hour from the initiation of the polymerization, after a lapse of 0.5 hour from the initiation, 3.5 kg/hr of ethylene and 10.2 L of hydrogen converted under normal temperature and normal pressure were fed to carry out the prepolymerization for 4 hours in total. After completion of the prepolymerization, the inside pressure of the reactor was decreased to 0.5 MPa through purging of gases.

A prepolymerization catalyst component in a slurry state was transferred to a drying apparatus for carrying out drying under a nitrogen flow to obtain the prepolymerization catalyst component. A prepolymerized amount of ethylene contained in the prepolymerization catalyst component was 18.2 g per 1 g of the co-catalyst support.

(2) Gas Phase Polymerization

To a continuous type fluidized bed gas phase polymerization apparatus, ethylene, 1-hexene and hydrogen were continuously fed so that a hydrogen molar ratio to ethylene of 2.1%, and 1-butene and 1-hexene molar ratios to the total of ethylene, 1-butene and 1-hexene of respective 2.1% and 0.6% were maintained and the composition was kept at constant during the polymerization. Further, the prepolymerization catalyst component, triisobutylaluminum and triethylamine (a molar ratio of triethylamine to triisobutylaluminum of 3%) were continuously fed to maintain a total powder weight in the fluidized bed to 80 kg. The average polymerization time was 4 hours. The powder of ethylene-1-butene-1-hexene copolymer thus obtained was granulated by using an extruder (manufactured by Kobe Steel Ltd. LCM50) under conditions of a feed rate of 50 kg/hr, a screw rotation of 450 rpm, gate opening of 50%, suction pressure of 0.1 MPa, and resin temperature of 200 to 230° C. to obtain an ethylene-1-butene-1-hexene copolymer. Properties of thus obtained ethylene-1-butene-1-hexene copolymer were evaluated and the results were shown in Table 1.

Comparative Example 1

(1) Preparation of Prepolymerization Catalyst Component

Into a previously nitrogen-purged autoclave having a content volume of 210 L equipped with a stirrer were charged 0.68 kg of the co-catalyst support (A) obtained in Example 1(1), 2 L of hydrogen converted under normal temperature and normal pressure and 80 L of butane. Thereafter, the autoclave was heated to 30° C. Further, ethylene was charged in an amount corresponding to 0.03 MPa of gas phase pressure in the autoclave. After the system was stabilized, then 210 mmol of triisobutylaluminum and 70 mmol of racemi-ethylenebis(1-indenyl)zirconium diphenoxide were charged therein to initiate prepolymerization.

After a lapse of 30 minutes, while continuously feeding 0.5 kg/hr of ethylene and 3.9 L/hr of hydrogen converted under normal temperature and normal pressure, further, 3.5 kg/hr of ethylene and 24 L/hr of hydrogen converted under normal temperature and normal pressure were fed continuously with elevation of the temperature to 51° C. thereby carrying out the prepolymerization for 4 hours in total. After completion of the prepolymerization, ethylene, butane, hydrogen gas and the like were purged and the remaining solid was dried under vacuum at room temperature to obtain a co-catalyst component in which 14 g of ethylene per 1 g of the above-mentioned co-catalyst support (A) was prepolymerized.

(2) Production of Ethylene-α-Olefin Copolymer

Using the prepolymerization catalyst component obtained above, copolymerization of ethylene, 1-butene and 1-hexene was carried out in the same manner as in Example 1(3) using a continuous type fluidized bed gas phase polymerization apparatus except that the polymerization temperature, the molar ratio of hydrogen to ethylene and the molar ratio of 1-hexene to the total of ethylene and 1-hexene were changed to 84° C., 1.0% and 0.5%, respectively, and 3% of 1-butene in terms of a molar ratio of 1-butene to the total of ethylene and 1-butene was fed.

An ethylene-1-butene-1-hexene copolymer powder thus obtained was granulated in the same manner as in Example 1(3) to obtain an ethylene-1-butene-1-hexene copolymer. Evaluation results of the copolymer were shown in Table 2.

Comparative Example 2

Evaluation results of a commercially available ethylene-α-olefin copolymer produced with a metallocene catalyst were shown in Table 2.

TABLE 1

| | Unit | Example 1 | Example 2 | Example 3 | Example 4 |
|---|---|---|---|---|---|
| Copolymer Physical Property | | | | | |
| MFR | g/10 min. | 0.44 | 1.3 | 0.28 | 1.99 |
| MFRR | — | 104 | 79 | 108 | 73 |
| Density (d) | kg/m$^3$ | 912.0 | 920.0 | 919.6 | 918.8 |
| Mw/Mn | — | 10.8 | 10.2 | 16.5 | 17.3 |
| Ea | kJ/mol | 71 | 68 | 67 | 65 |
| τ | sec | 5.13 | 3.41 | 8.64 | 2.57 |
| Right side of Formula (1) | | 6.65 | 3.56 | 8.89 | 2.89 |
| Left side of Formula (1) | | 3.36 | 2.54 | 3.86 | 2.32 |
| EHR | — | 89.5 | 83.9 | 93.9 | 87.5 |
| Right side of Formula (2) | | 90.6 | 84.6 | 94.6 | 81.7 |
| Moldability | | | | | |
| Resin pressure | MPa | 34 | 23 | 33 | 20 |
| Physical property of molded article | | | | | |
| Haze | % | 5.5 | 5.8 | 6.4 | 5.6 |

TABLE 2

| Copolymer Physical Property | Unit | Comparative Example 1 | Comparative Example 2 |
|---|---|---|---|
| MFR | g/10 min. | 0.84 | 0.98 |
| MFRR | — | 100 | 37 |
| Density (d) | kg/m$^3$ | 917.8 | 912.7 |
| Mw/Mn | — | 16.1 | 2.1 |
| Ea | kJ/mol | 68 | 66 |
| τ | sec | 7.14 | 1.65 |
| Right side of Formula (1) | | 4.52 | 4.15 |
| Left side of Formula (1) | | 2.82 | 2.71 |
| EHR | | 92.7 | 90.7 |
| Right side of Formula (2) | | 87.2 | 85.5 |
| Moldability | | | |
| Resin pressure | MPa | 26 | — |
| Physical property of molded article | | | |
| Haze | % | 8.1 | 10.8 |

The invention claimed is:

1. A resin composition comprising of an ethylene-α-olefin copolymer (A1) obtained by copolymerizing ethylene and an α-olefin in the presence of a metallocene catalyst and of an ethylene-α-olefin copolymer (B) obtained by copolymerizing ethylene with an α-olefin in the presence of a polymerization catalyst containing a solid component containing titanium, magnesium and a halogen, wherein
the ethylene-α-olefin copolymer (A1) has monomer units derived from ethylene and monomer units derived from an α-olefin of 3 to 20 carbon atoms, a melt flow rate (MFR) of 0.01 to 1.3 g/10 minutes, a density of 910 to 970 kg/m$^3$, an activation energy of flow of 50 kJ/mol or more and a molecular weight distribution measured by gel permeation chromatography of 7 to 25, wherein a characteristic relaxation time (τ, unit is second) determined by a melt viscoelasticity measurement and the MFR satisfy a relationship of the following formula (1):

$$3 \times MFR^{-0.75} + 1.1 > \tau > 1.3 \times MFR^{-0.5} + 1.4 \quad (1);$$

wherein the ethylene-α-olefin copolymer (B) has a melt flow rate (MFR) of 0.1 to 10 g/10 minutes, a density (d) of 900 to 970 kg/m$^3$, and an activation energy of flow of lower than 50 kJ/mol; and the content of copolymer (A1) is 1-70% by weight based on 100% by weight of the total of the copolymer (A1) and the copolymer (B); and wherein the copolymer (A1) includes 0.5 to 50 wt. % of said α-olefin.

2. A molded article obtained from the resin composition of claim 1.

3. The molded article according to claim 2, wherein the molded article is a film.

4. The resin composition according to claim 1, wherein in (A1) the MWD is less than 20.

5. The resin composition according to claim 1, wherein in (A1) the MWD is less than 15.

6. The resin composition according to claim 1, wherein in (A1) the MWD is 7 to 10.8.

7. A resin composition comprising of an ethylene-α-olefin copolymer (A2) obtained by copolymerizing ethylene and an α-olefin in the presence of a metallocene catalyst and of an ethylene-α-olefin copolymer (B) obtained by copolymerizing ethylene with an α-olefin in the presence of a polymerization catalyst containing a solid component containing titanium, magnesium and a halogen, wherein
the ethylene-α-olefin copolymer (A2) has monomer units derived from ethylene and monomer units derived from an α-olefin of 3 to 20 carbon atoms, a melt flow rate (MFR) of 0.01 to 1.3 g/10 minutes, a density (d) of 910 to 970 kg/m$^3$, an activation energy of flow of 50 kJ/mol or more and a molecular weight distribution measured by gel permeation chromatography 7 to 25, wherein an external haze ratio (EHR), the MFR and the density satisfy a relationship of the following formula (2):

$$EHR < -15 \times \log MFR + 0.145 \times d - 47 \quad (2);$$

the ethylene-α-olefin copolymer (B) has a melt flow rate (MFR) of 0.1 to 10 g/10 minutes, a density (d) of 900 to 970 kg/m$^3$, and an activation energy of flow of lower than 50 kJ/mol; and
the content of copolymer (A2) is 1-70% by weight based on 100% by weight of the total of the copolymer (A2) and the copolymer (B), and wherein the copolymer (A2) includes 0.5 to 50 wt. % of said α-olefin.

8. A molded article obtained from the resin composition of claim 7.

9. The molded article according to claim 8, wherein the molded article is a film.

10. The resin composition according to claim 7, wherein in (A2) the MWD is less than 20.

11. The resin composition according to claim 7, wherein in (A2) the MWD is less than 15.

12. The resin composition according to claim 7, wherein in (A2) the MWD is 7 to 10.8.

13. A resin composition comprising of an ethylene-α-olefin copolymer (A1) obtained by copolymerizing ethylene and an α-olefin in the presence of a metallocene catalyst and of an ethylene-α-olefin copolymer (B) obtained by copolymerizing ethylene with an α-olefin in the presence of a polymerization catalyst containing a solid component containing titanium, magnesium and a halogen, wherein
the ethylene-α-olefin copolymer (A1) has monomer units derived from ethylene and monomer units derived from an α-olefin of 3 to 20 carbon atoms, a melt flow rate (MFR) of 0.44 to 1.3 g/10 minutes, a density of 910 to 970 kg/m$^3$, an activation energy of flow of 50 kJ/mol or more and a molecular weight distribution measured by gel permeation chromatography of 6 to 25, wherein a characteristic relaxation time (τ, unit is second) determined by a melt viscoelasticity measurement and the MFR satisfy a relationship of the following formula (1):

$$3 \times MFR^{-0.75}+1.1 > \tau > 1.3 \times MFR^{-0.5}+1.4 \quad (1);$$

wherein the ethylene-α-olefin copolymer (B) has a melt flow rate (MFR) of 0.1 to 10 g/10 minutes, a density (d) of 900 to 970 kg/m$^3$, and an activation energy of flow of lower than 50 kJ/mol; and the content of copolymer (A1) is 1-70% by weight based on 100% by weight of the total of the copolymer (A1) and the copolymer (B); and wherein the copolymer (A1) includes 0.5 to 50 wt. % of said α-olefin.

14. A resin composition comprising of an ethylene-α-olefin copolymer (A2) obtained by copolymerizing ethylene and an α-olefin in the presence of a metallocene catalyst and of an ethylene-α-olefin copolymer (B) obtained by copolymerizing ethylene with an α-olefin in the presence of a polymerization catalyst containing a solid component containing titanium, magnesium and a halogen, wherein the ethylene-α-olefin copolymer (A2) has monomer units derived from ethylene and monomer units derived from an α-olefin of 3 to 20 carbon atoms, a melt flow rate (MFR) of 0.44 to 1.3 g/10 minutes, a density (d) of 910 to 970 kg/m$^3$, an activation energy of flow of 50 kJ/mol or more and a molecular weight distribution measured by gel permeation chromatography 6 to 25, wherein an external haze ratio (EHR), the MFR and the density satisfy a relationship of the following formula (2):

$$EHR < -15 \times \log MFR + 0.145 \times d - 47 \quad (2);$$

the ethylene-α-olefin copolymer (B) has a melt flow rate (MFR) of 0.1 to 10 g/10 minutes, a density (d) of 900 to 970 kg/m$^3$, and an activation energy of flow of lower than 50 kJ/mol; and the content of copolymer (A2) is 1-70% by weight based on 100% by weight of the total of the copolymer (A2) and the copolymer (B), and wherein the copolymer (A2) includes 0.5 to 50 wt. % of said α-olefin.

* * * * *